United States Patent
Arndt Dr habil et al.

(10) Patent No.: US 12,159,533 B2
(45) Date of Patent: Dec. 3, 2024

(54) METHOD FOR PASSING ALONG NARROW ROADS

(71) Applicant: Ford Global Technologies, LLC, Dearborn, MI (US)

(72) Inventors: Christoph Arndt Dr habil, Moerlen (DE); Frederic Stefan, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 293 days.

(21) Appl. No.: 17/808,370

(22) Filed: Jun. 23, 2022

(65) Prior Publication Data

US 2022/0415171 A1   Dec. 29, 2022

(30) Foreign Application Priority Data

Jun. 28, 2021 (DE) .......................... 102021116599.7

(51) Int. Cl.
| | | |
|---|---|---|
| *G08G 1/09* | (2006.01) | |
| *G08G 1/01* | (2006.01) | |
| *G08G 1/015* | (2006.01) | |
| *G08G 1/052* | (2006.01) | |
| *G08G 1/0967* | (2006.01) | |
| *G08G 1/16* | (2006.01) | |

(52) U.S. Cl.
CPC ......... *G08G 1/0967* (2013.01); *G08G 1/0112* (2013.01); *G08G 1/015* (2013.01); *G08G 1/052* (2013.01); *G08G 1/16* (2013.01)

(58) Field of Classification Search
CPC .... G08G 1/0967; G08G 1/0112; G08G 1/015; G08G 1/052; G08G 1/16
See application file for complete search history.

(56) References Cited

U.S. PATENT DOCUMENTS 10,834,552 B1 *  11/2020  Saito ................ G08G 1/096791

FOREIGN PATENT DOCUMENTS

| DE | 112016003794 T5 | * | 5/2018 |
|---|---|---|---|
| JP | 2000293783 A | * | 10/2000 |
| JP | 2002367076 A | * | 12/2002 |
| JP | 2008262418 A | * | 10/2008 |
| JP | 2019053646 A | * | 4/2019 |
| KR | 20050094851 A | * | 9/2005 |
| KR | 20170070392 A | * | 6/2017 |

OTHER PUBLICATIONS

English translation of KR 20170070392 A (Year: 2017).*
English translation of JP-2002367076-A (Year: 2002).*
English translation of KR 20050094851 A (Year: 2005).*
English translation of JP-2000293783-A (Year: 2000).*
English translation of DE-112016003794-T5 (Year: 2018).*
English translation of JP 2019053646 A (Year: 2019).*
English translation of JP 2008262418 A (Year: 2008).*

* cited by examiner

*Primary Examiner* — Jess Whittington
*Assistant Examiner* — Matthew Ho
(74) *Attorney, Agent, or Firm* — Joseph Zane; Eversheds Sutherland (US) LLP

(57) ABSTRACT

A method is provided for controlling a passage along a single-track roadway section, wherein confrontational meetings of vehicles moving in opposite directions of travel are avoided through speed adjustment and use of stopping facilities within the single-track roadway section. A system and a vehicle for carrying out the method are further provided.

10 Claims, 3 Drawing Sheets

METHOD FOR PASSING ALONG NARROW ROADS

CROSS-REFERENCE TO RELATED APPLICATIONS

This application claims priority to and the benefit of German Application No. DE 102021116599.7, filed Jun. 28, 2021, which is hereby incorporated by reference herein in its entirety.

FIELD

The invention relates to a method for controlling a passage of a vehicle along a narrow roadway section, and a system for carrying out the method and a motor vehicle having the system.

BACKGROUND

Roads which are too narrow to allow two vehicles moving in opposite directions to pass one another are often encountered in rural areas. In such cases, one vehicle has to reverse if its driver has not identified the situation in a timely manner, until a section with sufficient space has been found so that the other vehicle can drive past. Such sections can be designed e.g. as stopping places provided for obstacle avoidance. Reversing is uncomfortable and time-consuming, particularly on narrow roads, and is complicated, particularly for larger vehicles such as trucks or buses.

Two-lane roads can also be narrowed in wintry conditions by snow and ice. Snow-clearing vehicles similarly force oncoming vehicles to reverse. The road conditions make reversing even more difficult.

Narrow roads are furthermore not normally designed in such a way that the end of a narrow section can already be seen at its start. Not only bends, but also trees, bushes or artificial structures restrict visibility. Driving technique must be adapted accordingly to the conditions.

SUMMARY

The object is therefore to design a safer passage of a plurality of vehicles along narrow streets. This object is achieved by a method according to claim 1, a system according to claim 9 and a vehicle according to claim 10. Further advantageous designs of the invention can be found in the example embodiments, the subclaims and the description. The designs of the invention can advantageously be combined with one another.

A first aspect of the invention relates to a method for controlling a passage along at least one roadway section lying ahead of a current direction of travel of a first vehicle, wherein the width of said roadway section roughly corresponds to that of the first vehicle, comprising the steps of:
detecting the roadway section lying ahead,
determining the distance and calculating the time required by the first vehicle to reach said roadway section, and calculating the time of leaving the roadway section assuming that the roadway section can be driven through without influence from other vehicles,
transmitting data from the first vehicle to a network, wherein the data are selected from the group comprising the estimated time of reaching the roadway section, the time of leaving the roadway section assuming that the roadway section can be driven through without influence from other vehicles, the location of entry into the roadway section, the direction of travel and the type of the first vehicle,
identifying at least one second vehicle which is expected to be moving in the area of the roadway section, receiving data relating to the second vehicle and determining a probability of a meeting of the first and second vehicle within the roadway section,
determining a speed in each case for both vehicles to avoid a meeting of the first and second vehicle within the roadway section.

The method according to the invention advantageously enables at least two vehicles to drive along narrow roads by controlling the individual vehicle speeds. A roadway section lying ahead whose width roughly corresponds to that of the first vehicle is also referred to here as a bottleneck. The method is suitable for bottlenecks of different lengths. The length of a bottleneck can be between one meter and several kilometers.

In the method, the travelling time to reach the bottleneck is optimized on the basis of an identified bottleneck and detected further vehicles, so that comfortable and safe driving is advantageously possible, wherein the probability e.g. of forced reversing or a risk of a collision of vehicles in the area of the bottleneck is low compared with conventional driving. The vehicle is designed to capture method-related data, i.e., for example, with a camera, a distance-measuring device and the like. Map-related data can further be accessed in the vehicle, e.g. via a navigation device which provides information relating to bottlenecks in the roadway lying ahead. The vehicle is designed to transmit and receive data. The vehicle can have a connection to a server which processes data and transmits instructions. The vehicle can also process data itself, i.e. it can itself act accordingly as a server with a connection to other vehicles from which it receives data relating to their position and speed and outputs control commands. Bottlenecks can further be identified from the driving history, i.e. on the one hand based on the driven routes of the first vehicle, and/or based on a database available online with driving histories of further vehicles which have passed along the route. Databases of this type can contain e.g. information relating to narrow roads in wintry conditions.

The route up until the bottleneck is reached can be captured e.g. with on-board sensors or by means of map information or information from a navigation device. The time required to reach the bottleneck is derived from the speed of the first vehicle and the current distance to the bottleneck. The calculated time for driving through the bottleneck is derived from the length of the bottleneck and the estimated speed. The data are constantly re-determined with a modified vehicle position and speed.

In the case where side roads join the roadway to be travelled, the time required to reach the junction of a side road with the roadway to be travelled is preferably indicated in each case. The side roads can join the roadway to be travelled directly in the area of the bottleneck or spatially in front of or behind the roadway to be travelled. A tree-like layout plan can be drawn up for this purpose so that each side road corresponds to a branch to which a time is in each case assigned. In one preferred embodiment of the method, the second vehicle is located on a side road which joins the roadway to be travelled by the first vehicle.

Following the identification and the approach to a bottleneck, the vehicle begins to transmit data to a network, said data relating to the bottleneck and to the vehicle with reference to driving through the bottleneck. A corresponding network can be, for example, a 5G, LTE (Long Term Evolution), vehicle-to-vehicle or vehicle-to-infrastructure network. The network processes the data and informs further vehicles in the area of the bottleneck of the imminent passage through the bottleneck by the first vehicle. The data in each case comprise the estimated time when the first vehicle reaches the bottleneck, the current position and the direction of travel of the first vehicle, and also the estimated time when the first vehicle leaves the bottleneck.

In order to identify at least one second vehicle which will be moving in the area of the bottleneck, vehicle movements are captured both on the roadway ahead of the first vehicle and on side roads which join the roadway lying ahead of the first vehicle. Vehicles from the side roads can also potentially meet the first vehicle. The first and the second vehicle and obviously, where appropriate, further vehicles, can exchange information via the aforementioned networks relating to intended directions of travel and planned roadway use, so that possible positions can be calculated at which the vehicles could meet one another. If a meeting point of this type is identified, vehicles can choose an optimum speed so that they do not meet one another in the area of the bottleneck.

A vehicle is, in particular, a multi-track motor vehicle, for example a passenger vehicle, a truck or an omnibus. The width of the roadway section corresponds accordingly to the width of a multi-track motor vehicle. The method is also suitable for single-track vehicles, for example motorcycles, since the roadway section may not be wide enough for a multi-track vehicle and a single-track vehicle, i.e., for example, a passenger vehicle and a motorcycle cannot drive past one another.

The first vehicle or the second vehicle is preferably guided to a wider area of the roadway in the roadway section and stops, and the second vehicle or the first vehicle is guided past the stopped vehicle. The speed can be controlled, for example, in such a way that, in the case of a lengthy bottleneck, the first vehicle reaches a stopping place so that the second vehicle can drive past at optimum speed without delay. Time and fuel are advantageously saved in this way.

The speed of the vehicle guided past is preferably controlled in the method in such a way that the time spent by the stopped vehicle in the wider area of the roadway is minimized. The speed of the vehicle guided past is controlled in such a way that the highest possible speed is chosen according to the permitted speed and the speed that is possible in the area of the bottleneck.

In one preferred embodiment of the method, the width of the roadway section is defined by a temporary obstacle. The temporary obstacle is preferably selected from the group comprising roadworks, obstacles caused by wintry conditions and broken-down vehicles. Obstacles caused by wintry conditions are, for example, snowdrifts, piled-up snow, piled-up ice, freezing conditions and the like, without being restricted to this list. The corresponding bottleneck is limited in time and space, so that both the presence and a removal of the bottleneck can be communicated via a network. A bottleneck of this type can be identified by means of vehicle sensors which measure the roadway width and compare the obtained measured values with map information. A camera, for example, which captures the roadway boundaries to the left and right side, or ultrasound sensors which detect walls to the left and right side created by snow and ice can be used as vehicle sensors. If the data captured by the vehicle sensors do not match the map information, the data are transmitted via the network to a central location which evaluates the information. The central location can be an immobile facility, e.g. a station; alternatively, the data can also be processed by mobile means, e.g. on board a vehicle. For this purpose, the data relating to the temporary bottleneck are also compared with data from other vehicles. The central location provides corresponding updates for the map information and informs further vehicles which are moving in the vicinity of the bottleneck and are soon likely to drive into the bottleneck. The vehicles can be informed e.g. via a navigation device.

Changed road conditions can be handled by navigation systems, e.g. in the same way that information relating to vehicle tailbacks is normally handled. The information relating to temporary bottlenecks can therefore also be incorporated into routing algorithms in order to find optimum routes around the bottleneck.

Positions of possible turn-offs from the road or available stopping places in the area of the bottleneck are furthermore preferably provided. The information for vehicles approaching the bottleneck thus comprises the location of the bottleneck, the width of the bottleneck, turn-offs from and junctions with the roadway, speed limits and the like.

In one further preferred embodiment of the method, a master vehicle which determines the speeds of the vehicles and selects stopping places is selected from more than two vehicles moving in the area of the road section. The vehicles are virtually lined up according to their current position and therefore the estimated time of their arrival at the bottleneck. The master vehicle determines an optimum strategy for passing through the bottleneck and transmits this to all vehicles concerned which must then adapt according to the predetermined speeds and stops. Advantageously, not all vehicles need to communicate with one another. As an alternative to the master vehicle, instructions for passing through the bottleneck can also be issued by a central facility of the infrastructure.

The method is preferably carried out in an automated manner. The method can be carried out by all forms of automated vehicles.

A second aspect of the invention relates to a system having a control device designed to carry out the method according to the invention. The advantages of the system correspond to the advantages of the method according to the invention.

A third aspect of the invention relates to a motor vehicle having a system according to the invention.

BRIEF DESCRIPTION OF THE DRAWINGS

The invention is explained in detail with reference to the figures, wherein.

DETAILED DESCRIPTION

The systems and methods disclosed herein can be implemented on a computing device located at a vehicle and/or over a network. The computing device may include memory and one or more processors. In some instances, the computing device may be one or more controllers or the like.

Figure 1:
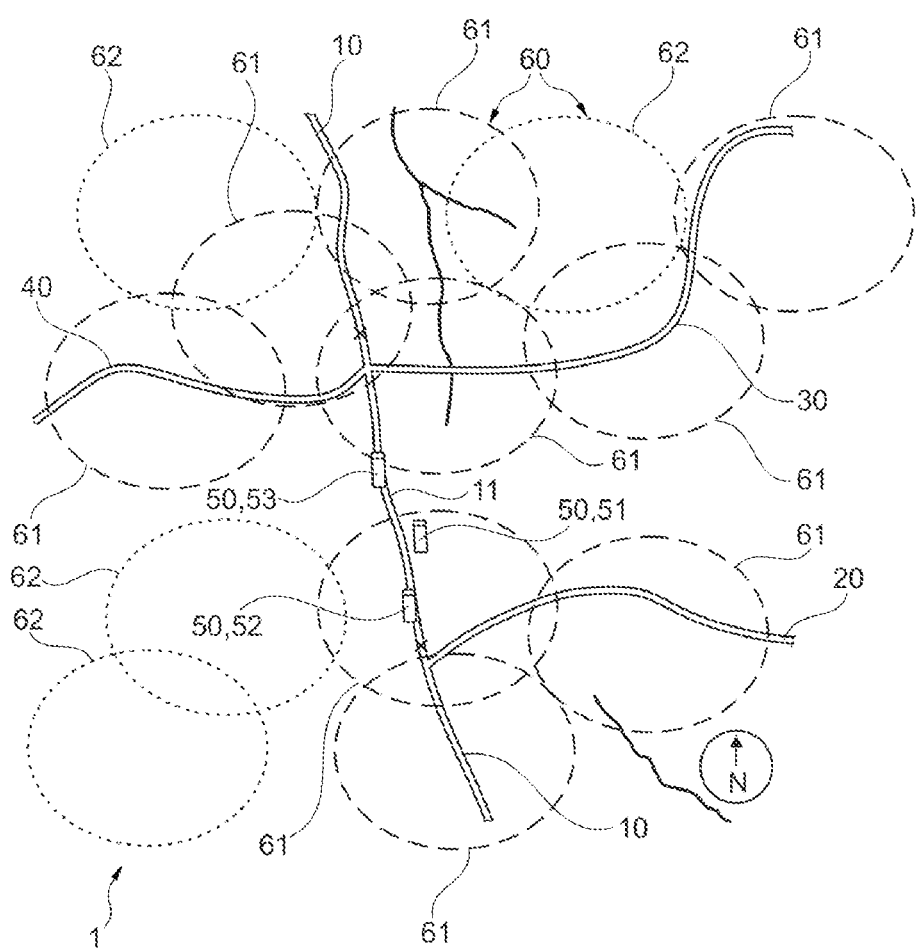
FIG. 1 shows a map with a road having a bottleneck map, to which a higher-level mobile radio network is assigned.

FIG. 1 shows a roadmap 1 on which a route of a first roadway 10 is shown. The first roadway 10 is an asphalted road. The map is oriented north. The first roadway 10 is joined from an easterly direction by a second roadway 20, to the north thereof by a third roadway 30, and from a westerly direction opposite the third roadway 30 by a fourth roadway 40. Said roadways have asphalt as a road covering. The roadways are referred to synonymously as roads.

The first roadway 10 is designed as single-track in the area 11 from north of the junction with the second roadway 20 to north of the junctions with the third roadway 30 and the fourth roadway 40 (marked by crosses on the map 1), i.e. its width is dimensioned in such a way that one multi-track vehicle can drive through unimpeded, but not two next to one another, i.e. two vehicles cannot pass one another. The roadway area 11 designed as single-track is also referred to as a bottleneck 11. The local conditions (mountains, sloping terrain) permit only a single-track design of the first roadway 10. In the case of a normally two-track roadway, roadworks and/or wintry conditions (snow, ice) can result in a narrowing of the roadway, so that only a single track is drivable.

Three wider roadway areas 50 are present in the first road roadway 10 north of the junction with the second roadway 20 and south of the junctions with the third roadway 30 and the fourth roadway 40. Stopping areas which are provided directly for avoiding oncoming traffic are designed as a wider roadway area according to the representation shown in FIG. 1. Alternatively, for example, emergency stopping areas provided for broken-down vehicles or bus stops can also be used for the temporary stopping of a vehicle. A first stopping area 51 is formed on the right-hand roadway side, and a second stopping area 52 and a third stopping area 53 are formed on the left-hand roadway side.

The roadmap 1 shows a network of mobile radio cells 60. These cells can be used to monitor a current usage of the roadways. The mobile radio cells further enable communication between vehicles and evaluation of the optimum traffic flow. The relevant cells 61 are indicated by dashed lines, the non-relevant cells 62 by dotted lines. The mobile radio network is a 5G network. Alternatively, it can also be, for example, an LTE (Long Term Evolution), vehicle-to-vehicle or vehicle-to-infrastructure network.

Figure 2:
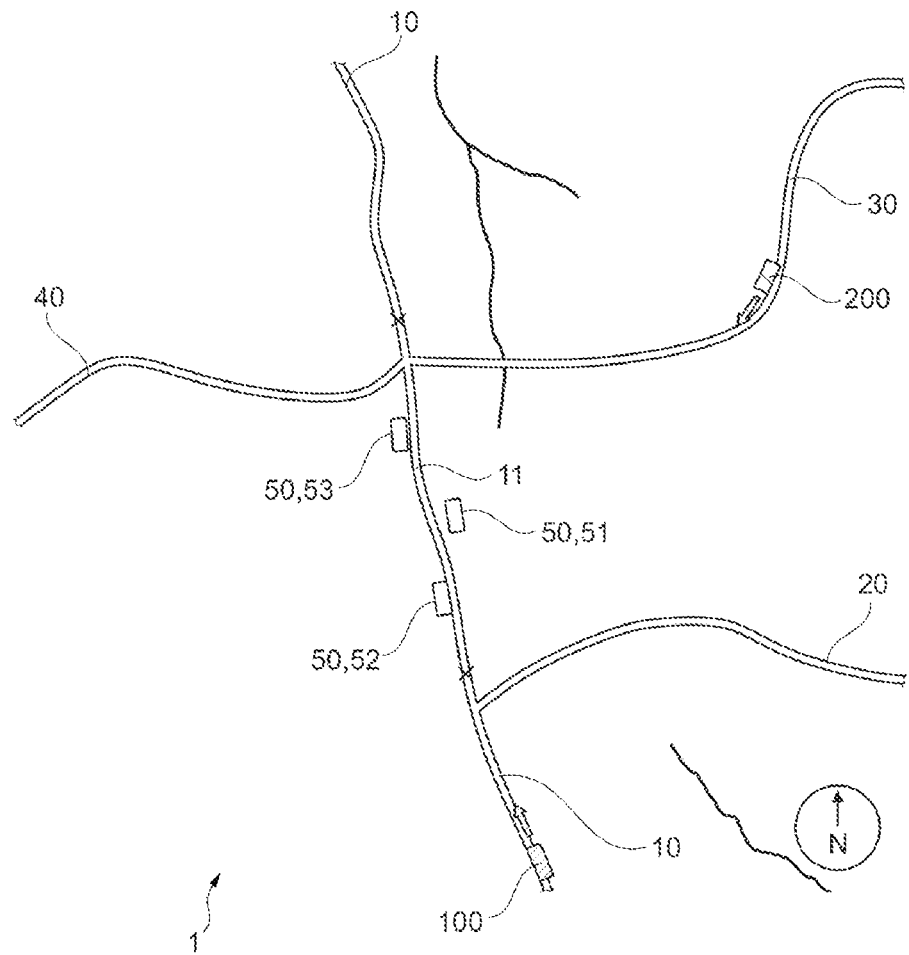
FIG. 2 shows the map representation from FIG. 1 in which two vehicles are moving in the direction of the bottleneck.

A situation with vehicles is presented in FIG. 2 on the roadmap 1 shown in FIG. 1. A first vehicle 100 is located in the southern area of the first roadway 10. The first vehicle 100 is also designed as the ego vehicle, since the method is carried out from its perspective. The first vehicle 100 is a passenger vehicle; alternatively, it can also be, for example, a truck or an omnibus. The first vehicle 100 is moving according to the direction of travel arrow toward the bottleneck 11. A second vehicle 200 is located on the third roadway 30. It is moving according to the direction of travel arrow toward the first roadway 10 and therefore similarly toward the bottleneck 11.

Figure 3:
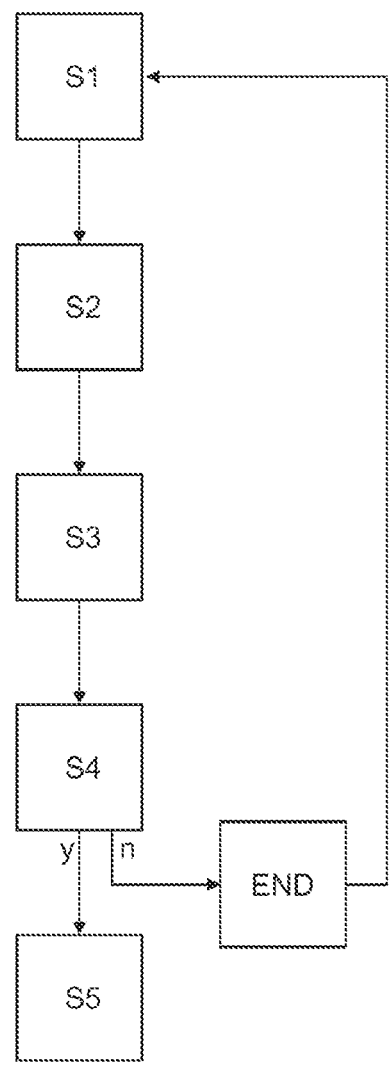
FIG. 3 shows a flow diagram of one embodiment of the method according to the invention.

In one embodiment of the method according to the invention as shown in FIG. 3, in a first method step S1, the first vehicle 100 detects the roadway section lying ahead via a navigation device located on board. The start and end of the bottleneck are output by the navigation device as map information. The first vehicle 10 is moving at a specific speed (70 km/h), so that, in a second step S2, the time of its movement in the bottleneck can be calculated (time of entry, time of exit assuming that it does not meet any oncoming traffic). In a third step S3, the first vehicle 100 transmits said data to the network so that the second vehicle 200 is informed of the planned use of the bottleneck by the first vehicle 100.

The second vehicle 200 is identified in a fourth step S4. To do this, the first vehicle 100 receives data via the network 60 relating to the second vehicle 200, inter alia the current position, speed, time of entry into the bottleneck 11, time of exit from the bottleneck 11 assuming that it does not meet any oncoming traffic, and planned direction of travel following its arrival at the first roadway 10. The vehicles 100, 200 can also establish vehicle-to-vehicle communication and can exchange the above-mentioned data directly.

A probability is determined, indicating whether and at what location within the bottleneck 11 a meeting of the first vehicle 100 and the second vehicle 200 within the bottleneck 11 is probable. In this example embodiment, the second vehicle 200 is moving at 70 km/h and plans to turn off to the left into the first roadway 10. There is therefore a high probability that the first vehicle 100 and the second 200 will meet within the bottleneck 11 in the area between the stopping area 51 and the stopping area 53 (Y for Yes, probable meeting). If the second vehicle 200 were to turn off to the right into the first roadway 10 or drive straight ahead on the fourth roadway 40 (N for No, no meeting), the meeting of the first vehicle 100 and the second vehicle 200 would be decided driving on sight according to existing rights of way and the method would be ended. In this case, the method would restart from the beginning at step S1. Alternatively, if the first vehicle 100 were moving at a significantly higher speed (e.g. 90 km/h) than the second vehicle 200, a meeting of the two vehicles 100, 200 in the bottleneck 11 would also be improbable, since the first vehicle 100 would already have left the bottleneck 11 when the second vehicle 200 arrived.

In step S5, a speed for avoiding such a meeting of the first vehicle 100 and the second vehicle 200 within the bottleneck which would force one of the vehicles 100, 200 to reverse is determined in each case for both vehicles 100, 200. It is determined that the second vehicle 200 will reach the stopping area 53 after the first vehicle 100 has driven past the stopping area 51. The second vehicle 200 is guided to this stopping area 53 in order to stop there, and the first vehicle 100 drives past the stopped second vehicle 200 at an optimum speed adapted to the bottleneck. The corresponding information is communicated in each case to each of the two vehicles 100, 200. In this way, the vehicles 100, 200 lose the minimum amount of time in passing through the bottleneck 11.

If the first vehicle 100 arrives at the stopping area 51 after the second vehicle has driven past the stopping area 53, the first vehicle 100 is guided to the stopping area 51 in order to stop there and allow the second vehicle 200 to pass.

Alternatively, a higher priority can be granted to a roadway, e.g. to the first roadway 10, than e.g. to the second roadway 20, according to which the vehicle coming from a roadway with a lower priority has to stop at the next stopping area. In this embodiment, the first vehicle 100 would drive through and the second vehicle 200 would stop in the stopping area 53 until the first vehicle 100 drove past.

In a further alternative embodiment of the method, the speed of the potentially colliding vehicles is adapted if no evasive action is possible within the bottleneck 11. The first vehicle 100, for example, is then guided through the bottleneck 11 at the permitted or possible maximum speed, and the second vehicle 200 at a correspondingly slower speed until the first vehicle 100 has passed through the area of a potential collision between the vehicles.

In a further situation (not shown), more than two vehicles are present and are moving at a specific distance from the bottleneck 11, i.e. in the area of the bottleneck 11 or toward it. This can also comprise vehicles in residential areas, parking lots or rest areas. All vehicles receive the aforementioned data from the first vehicle 100 and for their part also transmit data so that said data are exchanged with one another. In the simplest case, the vehicles wishing to pass through the bottleneck 11 are simply lined up according to their current distance from the bottleneck 11 and/or the calculated time of their arrival at the bottleneck 11 and pass through said bottleneck 11 according to this sequence. Complicated operations or negotiations between the vehicles are thereby avoided, wherein communication between individual vehicles is similarly possible.

However, for an optimum control of all vehicles through the bottleneck 11, it is advantageous to take account of all vehicles which are moving within the bottleneck 11 or toward the bottleneck 11. Methods known from communication theory can be used for this purpose. Information units are dispatched via information channels in different directions.

Alternatively, particularly in the case of highly complex situations involving a plurality of vehicles in the area of the bottleneck 11, a master vehicle can be designated, e.g. the first vehicle 100, which formulates the optimum strategy for passing through the bottleneck 11 and transmits this strategy to all further vehicles. Said further vehicles then follow the instructions from the master vehicle. In each case, the information comprises the position of the bottleneck 11, the arrival time of a vehicle at the bottleneck 11, the drive-through time, the exit time of the vehicle from the bottleneck 11, further vehicles moving toward the bottleneck, potential collision points and corresponding passing places, and also the optimum speed in order to reach the corresponding passing places. All information is constantly updated.

As an alternative to the master vehicle, the optimum sequence for passing through the bottleneck can also be calculated by a stationary server which is present e.g. in a facility of a local infrastructure. The individual vehicles then receive driving instructions or control commands from the server in order to pass through the bottleneck 11 with minimal delay.

The first vehicle 100 and also further vehicles can be automated so that it is possible to carry out the method in an automated manner at least in relation to some vehicles. The degree of automation of the correspondingly autonomously driven vehicles is communicated to other vehicles. This information can be communicated via a suitable display in the vehicle, e.g. via the display which already indicates the map information with the bottleneck 11.

REFERENCE NUMBER LIST

1 Roadmap
10 First roadway
11 Bottleneck
20 Second roadway
30 Third roadway
40 Fourth roadway
50 Wider roadway area
51 First stopping area
52 Second stopping area
53 Third stopping area
60 Mobile network
61 Relevant cells
62 Non-relevant cells
100 First vehicle
200 Second vehicle

The invention claimed is:

1. A method for controlling a passage along a roadway section of a roadway lying ahead of a current direction of travel of a first vehicle, wherein a first width of said roadway section corresponds to a second width of the first vehicle, comprising the steps of:
   detecting the roadway section lying ahead;
   determining a distance from a current location of the first vehicle to the roadway section;
   calculating an estimated time for the first vehicle to reach said roadway section,
   calculating a time of leaving the roadway section assuming that the roadway section can be driven through without influence from other vehicles;
   transmitting data from the first vehicle to a network, wherein the data includes the estimated time of reaching the roadway section, the time of leaving the roadway section, a location of entry into the roadway section, the current direction of travel, and a type of the first vehicle;
   identifying a second vehicle which is expected to be moving in the roadway section,
   receiving data relating to the second vehicle and determining a probability of a meeting of the first and second vehicle within the roadway section; and
   determining a first speed for the first vehicle and a second speed for the second vehicle to avoid the meeting of the first and second vehicle within the roadway section.

2. The method according to claim 1, wherein the second vehicle is located on a side road which joins the roadway to be travelled by the first vehicle.

3. The method according to claim 1, wherein the first vehicle or the second vehicle is guided to a wider area of the roadway and stops, and the second vehicle or the first vehicle is guided past the stopped vehicle.

4. The method according to claim 3, wherein the speed of the vehicle guided past enables the time spent by the stopped vehicle in the wider area of the roadway to be minimized.

5. The method according to claim 1, wherein the width of the roadway section is defined by a temporary obstacle.

6. The method according to claim 5, wherein the temporary obstacle is selected from the group comprising roadworks, obstacles caused by wintry conditions and broken-down vehicles.

7. The method according to claim 1, wherein a master vehicle which determines the speeds of the vehicles and selects stopping places is selected from more than two vehicles moving in the roadway section.

8. The method according to claim 1, wherein the method is carried out in an automated manner.

9. A system having a control device which is designed to carry out the method according to claim 1.

10. A motor vehicle having a system according to claim 9.

* * * * *